United States Patent
Henninger

(10) Patent No.: US 6,750,764 B1
(45) Date of Patent: Jun. 15, 2004

(54) APPARATUS AND METHOD FOR ENCOURAGING PROPER USE OF A SEAT BELT

(76) Inventor: Brent D. Henninger, 9161 S. Chickadee Cir., Sandy, UT (US) 84093

(*) Notice: Subject to any disclaimer, the term of this patent is extended or adjusted under 35 U.S.C. 154(b) by 158 days.

(21) Appl. No.: 09/667,142

(22) Filed: Sep. 21, 2000

(51) Int. Cl.⁷ .................................................. B60Q 1/00
(52) U.S. Cl. .................. 340/457.1; 280/735; 280/801.1
(58) Field of Search ............... 340/457.1, 540, 340/644, 433; 280/735, 801.1; 705/14; 180/270; 73/862.474; 704/258; 297/482

(56) References Cited

U.S. PATENT DOCUMENTS

| | | | | |
|---|---|---|---|---|
| 3,817,093 A | * | 6/1974 | Williams | 73/862.474 |
| 3,870,818 A | * | 3/1975 | Barton et al. | 704/258 |
| 4,715,839 A | * | 12/1987 | Ford et al. | 446/28 |
| 4,758,020 A | * | 7/1988 | Boyd | 280/801.1 |
| 4,973,106 A | * | 11/1990 | Strovinskas | 297/482 |
| 5,656,994 A | * | 8/1997 | Heninger | 340/457.1 |
| 6,024,382 A | * | 2/2000 | Baumann | 280/801.1 |
| 6,025,783 A | * | 2/2000 | Steffens, Jr. | 340/644 |
| 6,043,736 A | * | 3/2000 | Sawahata et al. | 340/438 |
| 6,140,921 A | * | 10/2000 | Baron et al. | 340/540 |
| 6,264,236 B1 | * | 7/2001 | Aoki | 280/735 |
| 6,260,650 B1 | * | 7/2002 | Gustavsson | 180/270 |

* cited by examiner

*Primary Examiner*—Benjamin C. Lee
(74) *Attorney, Agent, or Firm*—Kirton & McConkie; Michael F. Krieger

(57) ABSTRACT

An apparatus and method for encouraging and ensuring that a seat belt is properly secured about a passenger is disclosed. The invention comprises a sensor means for sensing when a seat belt is snug against a person secured by the seat belt, not simply when the seat belt has been engaged. Sensor means may comprise a means for sensing pressure that senses when the seat belt is being pressed against a passenger or it may comprise a means for sensing tension in the seat belt when the seat belt is snug against the passenger. Other means may also be suitable, including a thermal sensor or a proximity sensor. Although means for sensing whether the seat belt is engaged can also be used, it does not sense whether a seat belt is snug and is therefore not as advantageous. The invention further comprises an incentive or amusement device and control means for preventing the incentive device from operating properly unless the sensor means senses that the seat belt is snug against the passenger. Two embodiments are disclosed that allow the sensor means to be attached to a conventional seat belt. Alternatively, the sensor means can be used to communicate to the passenger or a driver when the seat belt is properly secured.

35 Claims, 7 Drawing Sheets

APPARATUS AND METHOD FOR ENCOURAGING PROPER USE OF A SEAT BELT

BACKGROUND OF THE INVENTION

1. The Field of the Invention

This invention relates to restraint systems for vehicles and, more particularly, to a novel apparatus and method for use in conjunction with a seat belt restraint system that encourages an occupant in a vehicle to regularly use the seat belt and/or monitors whether a seat belt is properly secured about the occupant. This application discloses improvements to the invention disclosed in this application's parent application.

2. The Relevant Technology

Automobile accidents are considered to be one of the leading causes of death or injury in the United States. Even though passive restraint systems such as lap/shoulder belts along with special car seat restraint devices have been shown statistically to reduce significantly the severity of injuries, especially to children, during automobile accidents, many parents or other care givers either consciously or unconsciously neglect to secure a child within an appropriate restraint system. Moreover, even adults can become careless or forgetful about properly securing themselves or their passengers.

Often the rationale for failure to use restraint systems with children is that it is too much bother or that children object too strenuously to being confined. Accordingly, many parents simply forego the use of a seat belt in order to avoid any unpleasantness. Some older children may even disengage a seat belt after it has been properly secured about them, without the parents or driver noticing. This is a potentially dangerous situation.

Some persons adopt the rationale that they are careful drivers or are only traveling a short distance, so that use of a seat belt is warranted neither for them nor their passengers. However, statistics have shown that many automobile accidents occur within 25 miles or so of home and generally are the result of unforeseen events over which even the most careful driver has absolutely no control.

In many automobiles today, a lighted icon is illuminated on a control panel and/or a sound is emitted when the seat belts of passengers are not engaged. This is conventionally implemented by sensors integrated into passenger and driver seats and seat belt couplings to determine if there is a passenger sitting in a given seat and, if so, whether his seat belt has been engaged. However, many passengers, even children, avoid use of the seat belt by engaging it without securing themselves within it, thereby circumventing the purpose of the weight and engagement sensors. For parents or drivers who wish to ensure that their passengers or children are properly secured in a seat belt, this is a potentially dangerous situation.

It goes without saying however, that monitoring whether a seat belt is properly secured is only the second best choice. If a passenger could be encouraged to use a seat belt and thereby develop a genuine desire to do so each time he enters a vehicle, a monitoring system might rarely be needed.

In view of the foregoing, it would be an advancement in the art to provide a device and methods for monitoring whether a seat belt is properly secured about a passenger. It would also be an advancement in the art to provide a system for encouraging the usage of a seat belt by passengers, especially children.

SUMMARY AND OBJECTS OF THE INVENTION

It is, therefore, an object of the present invention to provide improvements in apparatus and methods for monitoring whether a seat belt is properly secured about a passenger.

It is furthermore a primary object of this invention to provide improvements in apparatus and methods for encouraging usage of seat belts.

Another object of this invention is to provide a behavioral modification device which can be demountably affixed to a seat belt.

A further object of this invention is to provide a behavioral modification device which is activated upon proper securement of the seat belt.

Another object of this invention is to provide a behavioral modification system wherein the behavior modification device is interchangeable to retain interest for the person undergoing behavior modification.

Habit, properly directed, is probably the single most important aspect of behavior when it comes to such factors as seat belt usage. For example, airplane pilots have been reported as having reached for their seat belts when sitting down at the dinner table all as a result of a well-developed habit of seat belt usage. A pilot would never even consider starting engines without having the seat belt snugly in place. This is simply the result of habit, which is why it is so important to set the proper habit patterns in children. One goal of the present invention, therefore, is to make seat belt usage automatic so that each child will eventually insist upon using a seat belt when riding in any automobile.

The present invention includes an apparatus and method for monitoring whether a seat belt is properly secured about a passenger, and further, for even encouraging the use of a seat belt, especially by children. The invention comprises (1) a sensor, such as a pressure sensor, a tension sensor, a thermal sensor, or a proximity sensor that is integrated into or releasably attached to a seat belt and sensing when the seat belt is snug against a passenger, and (2) a means for communicating to a person that the seat belt is properly secured. In the case of a pressure sensor, the sensor is oriented toward the passenger to sense when the seat belt is securely fastened about the passenger and thus pressed snugly against him. An embodiment can be designed to simply communicate to the passenger or to another person, such as the driver, that the seat belt is pressed against the passenger or, alternatively, that it is not being pressed against the passenger. This may be done by means of an illuminated icon on an instrument panel, an audible sound, or any other method of communicating to a person the message that the seat belt is or is not properly secured.

An alternative embodiment can be modified to not only communicate that a seat belt is properly pressed against or snug against a passenger and therefore properly securing that passenger, but can also be designed to actually encourage the use of a seat belt by passengers, especially children. To do so, an incentive device and a control means are required, the control means preventing the incentive device from operating properly unless the pressure sensor, for example, senses that the seat belt is pressed against the passenger. The incentive device can be any preselected behavioral modification device such as an electronic toy, message system, or the like. When it operates, it may even, for example, transmit a predetermined reinforcement signal to the passenger such as a recorded statement, musical sounds, light displays, or the like. Thus, the incentive device will usually be an amusement device; but it can be any device that a passenger might want to use while buckled in and that would therefore provide an incentive to buckle up. The control means and a pressure sensor can be implemented together with a pressure switch used as the critical switch in an electrical circuit providing power to a toy or other amusement or incentive device. Proper securement of a seat belt causes the pressure switch to respond, which in turn allows the incentive device to operate. When the seat belt is not properly secured, the incentive device does not operate.

Furthermore, the present invention contemplates that such a device can be used with currently existing automobiles or other transportation systems by providing the pressure switch with a clip or other means for attaching the pressure switch to a conventional seat belt. In one such embodiment, a double-condition switch is used, making the incentive device capable of being used only when both (1) the pressure switch is engaged and (2) the switch is properly attached to a seat belt. This prevents the pressure switch from being depressed in some other way.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to a specific embodiment thereof which is illustrated in the appended drawings. Understanding that these drawing depict only a typical embodiment of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The invention is best understood from the following description of two embodiments of the invention, with reference to the accompanying drawings wherein like parts are designated with like numerals throughout and taken in conjunction with the appended claims.

Figure 1:
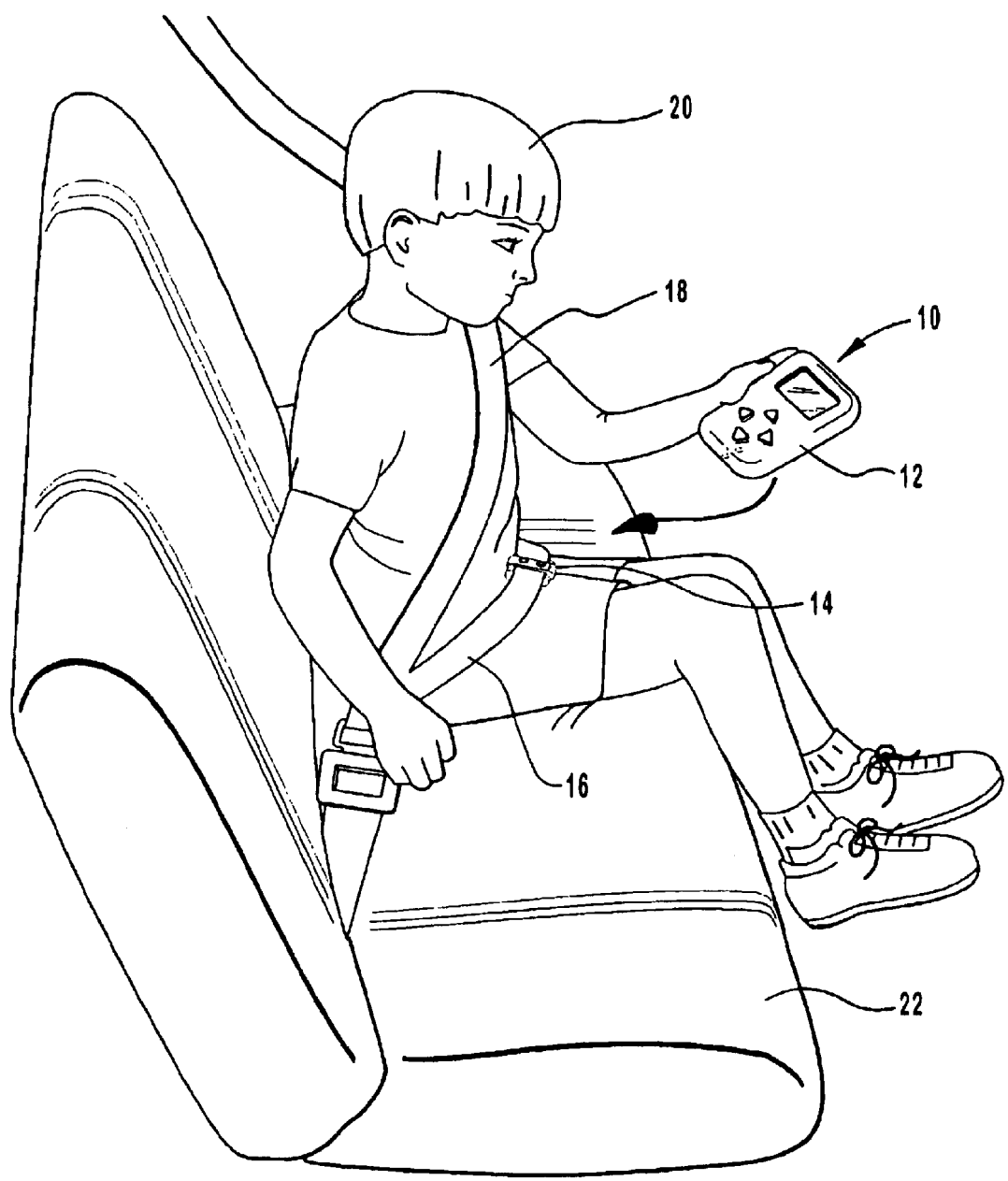
FIG. 1 is a perspective view of an embodiment of the invention adapted for use with a conventional seat belt by means of a belt clip housing shown in the environment of a seat belt engaged about a passenger.

Referring now to FIG. 1, a device embodying the present invention adapted for use with conventional seat belts is shown generally at 10 and includes an amusement device 12 attachable to a belt clip 14. Belt clip 14 is configured to be releasably mounted to a conventional seat belt 16. Seat belt 16 is combined with a shoulder belt 18 to provide the necessary restraint system for a passenger 20 riding on a seat 22 of an automobile (not shown). Amusement device 12 is shown as a hand portable electronic game device. Amusement device 12, as an electronic device, is specifically configured to be operable only upon attachment to belt clip 14 and only if belt clip 14 is secured to seat belt 16 and, further, only if seat belt 16 is snugly engaged about passenger 20. In this manner, passenger 20 can only achieve the entertainment benefit of amusement device 12 if, first, seat belt 16 is snugly engaged across the lap of passenger 20 and, second, if belt clip 14 is secured to seat belt 16 to thereby complete the necessary electrical circuitry for amusement device 12.

It should be noted that amusement device 12 need not be an electrically driven device but can be any other amusement device such as a stuffed toy, or the like which can be either removably mounted to belt clip 14 or permanently secured thereto. However, an electronic device such as amusement device 12 which must be secured to belt clip 14 and which must have belt clip 14 secured to a properly fastened seat belt 16 in order for amusement device 12 to be operable is the most advantageous system for encouraging passenger 20 to use seat belt 16. It should be further noted that, although belt clip 14 is shown as being secured to seat belt 16 on the lap belt portion of seat belt 16, belt clip 14 could also be used to secure adapter device 10 to shoulder belt 18.

Figure 2:
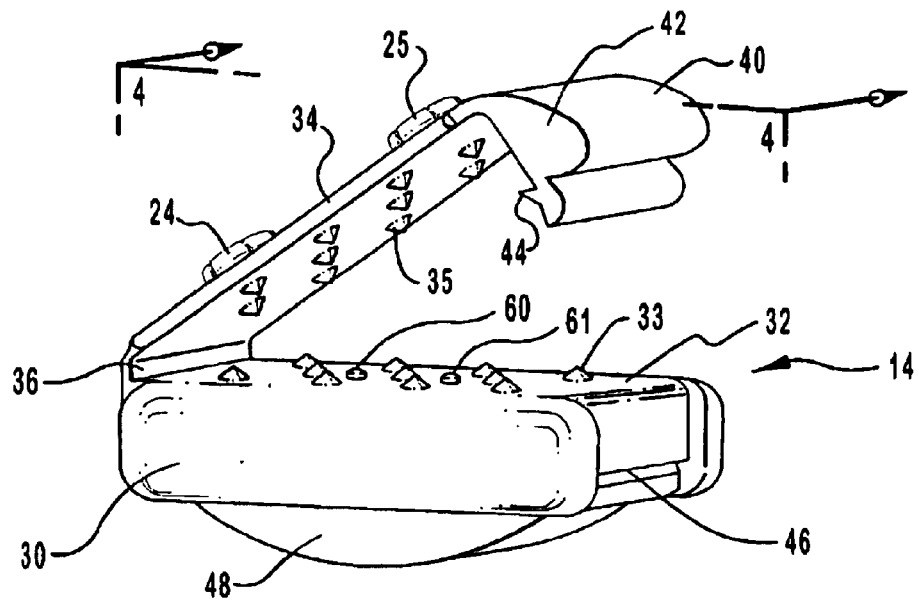
FIG. 2 is a perspective view of the belt clip embodiment shown in FIG. 1. The belt clip implements a double-condition switch, and is shown opened to receive a conventional seat belt.

Referring now to FIG. 2, belt clip 14 is shown prior to attachment to seat belt 16. In particular, belt clip 14 includes a body 30 having a lower jaw 32. An upper jaw 34 is hingedly joined to body 30 at a hinge 36 and cooperates with lower jaw 32 to engage seat belt 16 therebetween. Upper jaw 34 includes a latch 40 having a lip 42 extending downwardly from the end of upper jaw 34 with a sear 44 extending outwardly from the inner face of lip 42. Sear 44 is releasably engageable in a detent 46 on the end of body 30 to allow the user, passenger 20, for example, to releasably engage upper jaw 34 to lower jaw 32. The interface of lower jaw 32 includes a plurality of teeth 33, while the interface of upper jaw 34 includes a plurality of teeth 35. Importantly, the space between lower jaw 32 and upper jaw 34 is designed to receive therein seat belt 16 (FIGS. 1 and 3) with teeth 33 and teeth 35 engaging the respective surfaces of seat belt 16 engaged between lower jaw 32 and upper jaw 34.

Upper jaw 34 has spring clips 24 and 25 mounted on the outer surface thereof. Spring clips 24 and 25 are configured to releasably receive a corresponding pair of clip inserts 26 and 27 (FIG. 3) on the base of amusement device 12. Clip inserts 26 and 27 provide electrical contact from spring clips 24 and 25 to complete the electrical circuit between clip inserts 26 and 27.

Body 30 of belt clip 14 is preferably fabricated from a resilient material such as rubber or plastic so as to accommodate upper jaw 34 being hingedly joined to body 30 at hinge 36. Further, the resiliency of upper jaw 34 provides the necessary engagement force to hold sear 44 in detent 46, which force is readily overcome by the passenger's selectively pulling outwardly on lip 42 to disengage sear 44 from detent 46, thus causing latch 40 to be opened. Closure of latch 40 is readily accomplished by simply pushing lip 42 downwardly until sear 42 is received in detent 46. The resiliency of upper jaw 34 must be adequate to allow sear 44 to pass downwardly into engagement with detent 46 during this closure motion.

A pair of contacts 60 and 61 extend upwardly through the face of lower jaw 32 and are resilient mounted in body 30 by a pair of springs 62 and 63, respectively. Engagement of seat belt 16 between upper jaw 34 and lower jaw 32 causes seat belt 16 to depress contacts 60 and 61 downwardly against the resiliency of springs 62 and 63, respectively, until contacts 60 and 61 are exposed for possible electrical contact with contact plate 50 as will be discussed more fully hereinafter.

Body 30 includes a cavity 31 into which pressure pad 48 is telescopically received. Internally, cavity 31 includes a shelf 29 which circumscribes the interior of cavity 31 and serves as a retainer for releasably holding pressure pad 48 inside cavity 31. An outwardly oriented flange 49 circumscribes pressure pad 48 and rests against shelf 29. A pair of leaf springs 52 and 53 are mounted to the top surface of pressure pad 48 and resiliently engage a bottom surface of lower jaw 32 to resiliently urge flange 49 downwardly against shelf 29. Contact plate 50 is mounted to the top surface of pressure pad 48 at a position between leaf spring 52 and 53 where it is exposed to being raised into contact with contacts 60 and 61.

Figure 3:
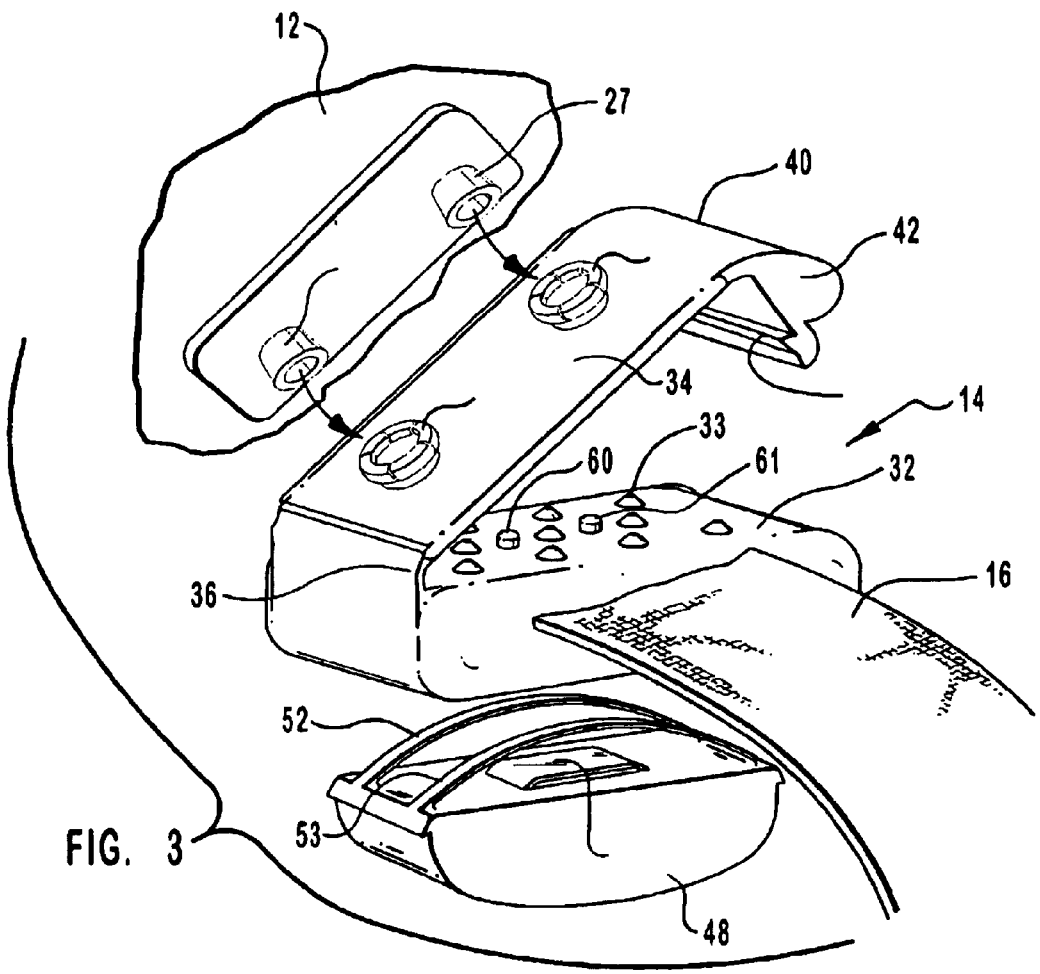
FIG. 3 is an exploded perspective view of the belt clip embodiment shown in the environment of fragmentary portions of a seat belt and an amusement device to illustrate the interrelationship of the various components.

Body 30 is configured as a hollow body having a cavity 31 therein with an opening in its bottom surface. A pressure pad 48 resiliently mounted in cavity 31 extends downwardly from body 30. Referring now to FIG. 3, pressure pad 48 is shown demounted from body 30 to illustrate the location of contact plate 50 and a pair of spring members 52 and 53 which resiliently urge pressure pad 48 downwardly with respect to body 30. The function of contact plate 50 and its interrelationship with spring members 52 and 53 will be discussed more fully hereinafter.

Figure 4:
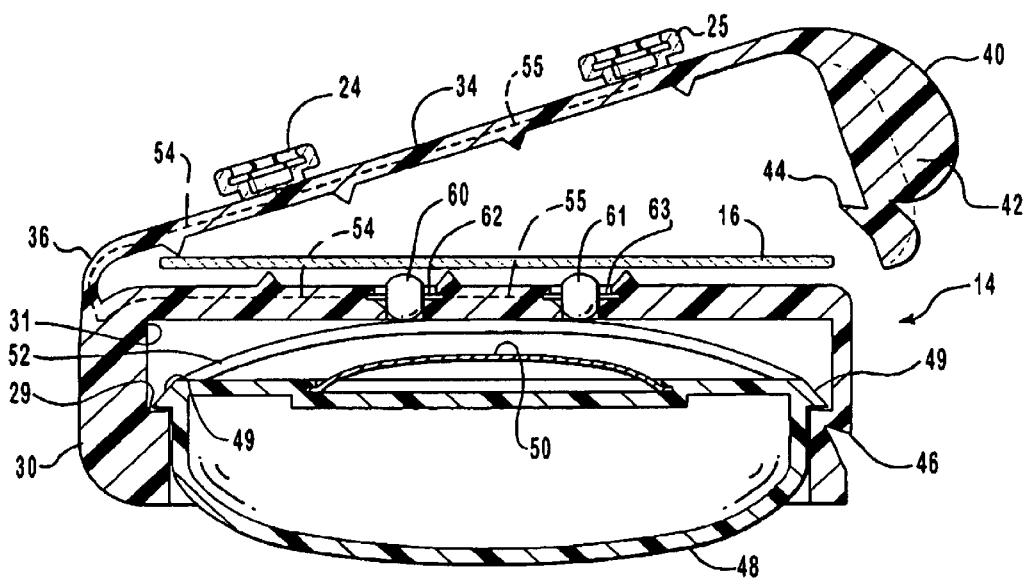
FIG. 4 is a cross-sectional view of the belt clip embodiment shown opened to receive therein the seat belt.
Figure 5:
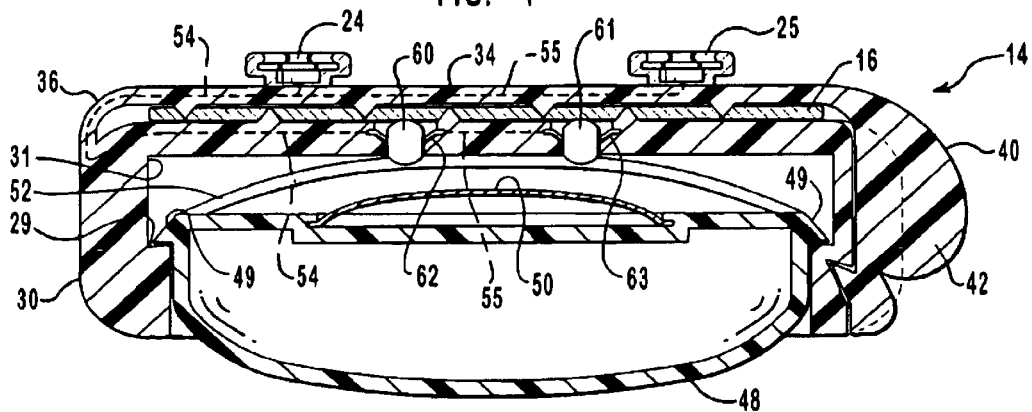
FIG. 5 is a cross-sectional view of FIG. 4 showing the belt clip embodiment closed upon the seat belt.
Figure 6:
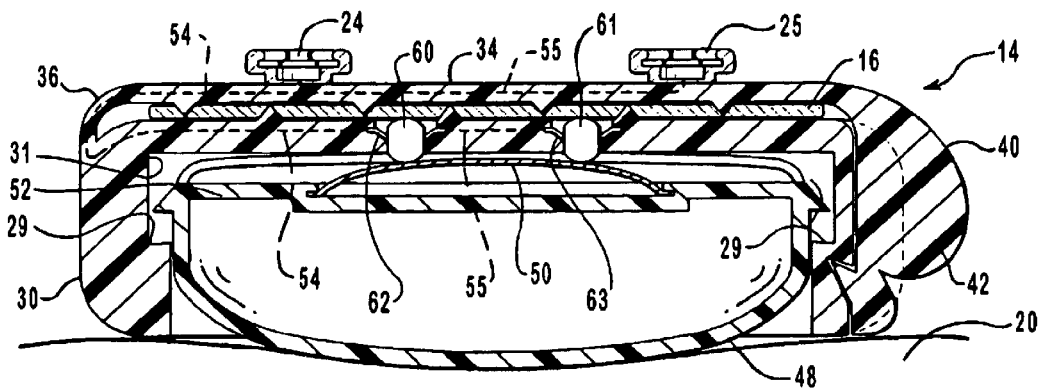
FIG. 6 is a cross-sectional view of FIG. 5 showing the belt clip embodiment closed upon the seat belt and pressed against the lap of a passenger to close the double-condition pressure switch mechanism therein.

Referring now to FIGS. 4–6, belt clip 14 is shown in three of its operative positions: open to receive seat belt 16 (FIG. 4); closed about seat belt 16 thereby pressing contacts 60 and 61 downwardly (FIG. 5); and pressed against passenger 20 thereby moving pressure pad 48 upward, bringing contact plate 50 into electrical contact with contacts 60 and 61 as they are pressed downwardly (FIG. 6). Accordingly, in order for the electrical circuit of amusement device 12 to be completed it is necessary for (1) seat belt 16 to be securely engaged between lower jaw 32 and upper jaw 34, as shown in FIG. 5, to thereby press contacts 60 and 61 downwardly; and (2) seat belt 16 to be drawn sufficiently snugly across the lap (or body) of passenger 20 to cause pressure pad 48 to be forced upwardly into body 30, bringing contact plate 50 into electrical contact with contacts 60 and 61, as shown in FIG. 6.

With specific reference to FIG. 6, belt clip 14 is shown cinched downwardly against the lap of passenger 20 by seat belt 16's having been suitably secured across the lap of passenger 20. Downward movement of belt clip 14 forces pressure pad 48 upwardly into cavity 31 to bring contact plate 50 into electrical contact across contacts 60 and 61. Contact plate 50 thereby completes the electrical circuit between contacts 60 and 61 to thus provide electrical energy to amusement device 12.

An alternative embodiment of belt clip 14 is illustrated in FIGS. 7–10 and is referred to as belt clip 14b.

Figure 7:
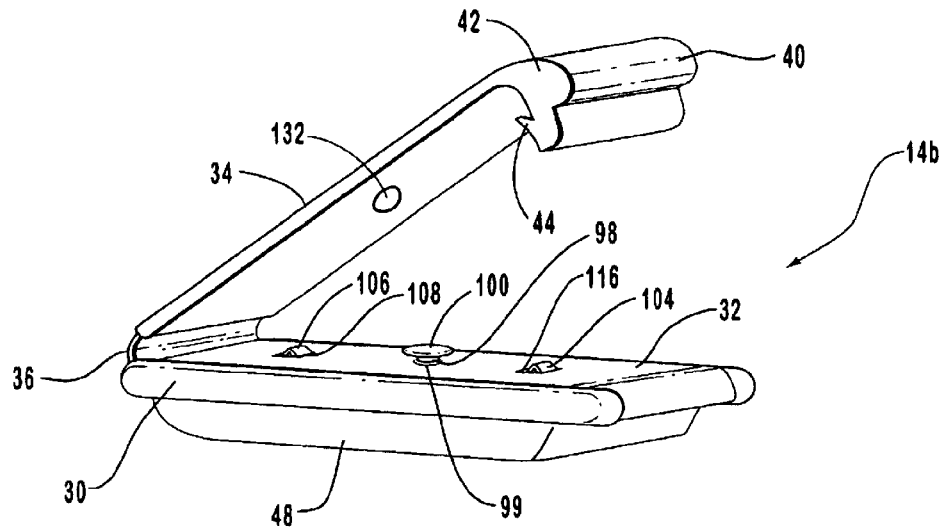
FIG. 7 is a perspective view of a belt clip embodiment with a different double-condition pressure switch structure shown opened to receive a seat belt.

Belt clip 14b comprises many of the same features as belt clip 14, and similar features and parts have been designated with like numerals. As shown in FIG. 7, belt clip 14b comprises an upper jaw 34 and a lower jaw 32 joined at a hinge 36. However, belt clip 14b is an improvement to belt clip 14, because it has a simpler design, is easier to manufacture, and is more easily used with a variety of amusement devices 12. As with belt clip 14, belt clip 14b embodies a double-condition switch mechanism, whereby amusement device 12 can only be operated when (1) seat belt 16 is inserted between upper jaw 34 and lower jaw 32 and upper jaw 34 is closed onto lower jaw 32, and (2) seat belt 16 is drawn sufficiently snugly across passenger 20 to cause pressure pad 48 to be forced further into cavity 31.

The structure used to implement the double-condition switch functionality of belt clip 14 in belt clip 14b is illustrated in FIGS. 7–10. Note that belt clip 14b is connected to amusement device 12 by means of a coaxial serial cable 70, both ends of which are terminated with a male connector 72 and 73. Male connector 73 comprises an outer contact 74 and an inner contact 76, which terminate the two coaxial conductors contained within cable 70. Accordingly, outer contact 74 is shielded from inner contact 76 by an insulator 78. Male connector 72 is identical to male connector 73 except that outer contact 74 of male connector 72 has been modified to be longer than outer contact 74 of male connector 73. This prevents misuse of the device. Use of cable 70 with belt clip 14b provides an advantage over belt clip 14. With belt clip 14, amusement device 12 must be plugged directly into belt clip 14. However, use of cable 70 with belt clip 14b allows amusement device 12 to be located a convenient distance away from belt clip 14b so that passenger 20 can position amusement device 12 in a convenient position.

Figure 8:
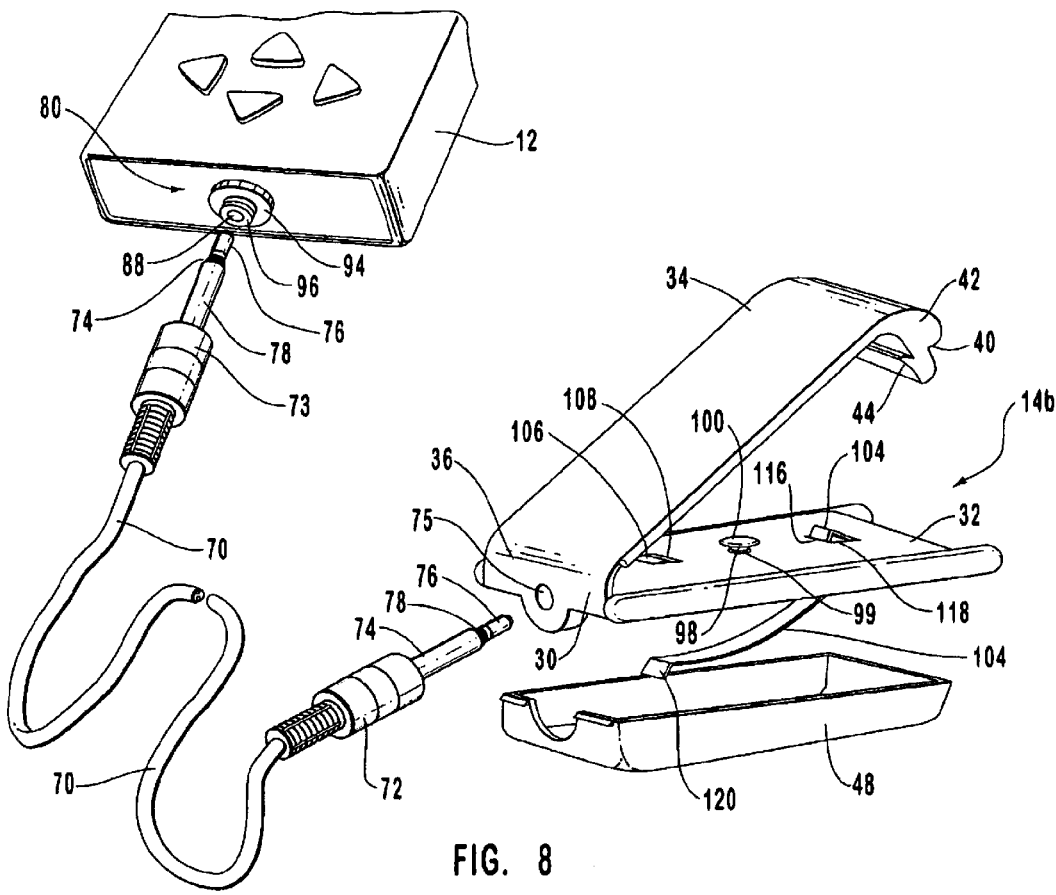
FIG. 8 is an exploded, perspective view of the belt clip embodiment illustrated in FIG. 7, shown with one end of a conventional coaxial serial cable that connects the belt clip to an amusement device.

Note that in FIG. 8, amusement device 12 is shown with a female connector 80, adapted to receive male connector 73. Female connector 80, just as cable 70, is commonly available and can be found at various electronics or other stores.

Figure 12:
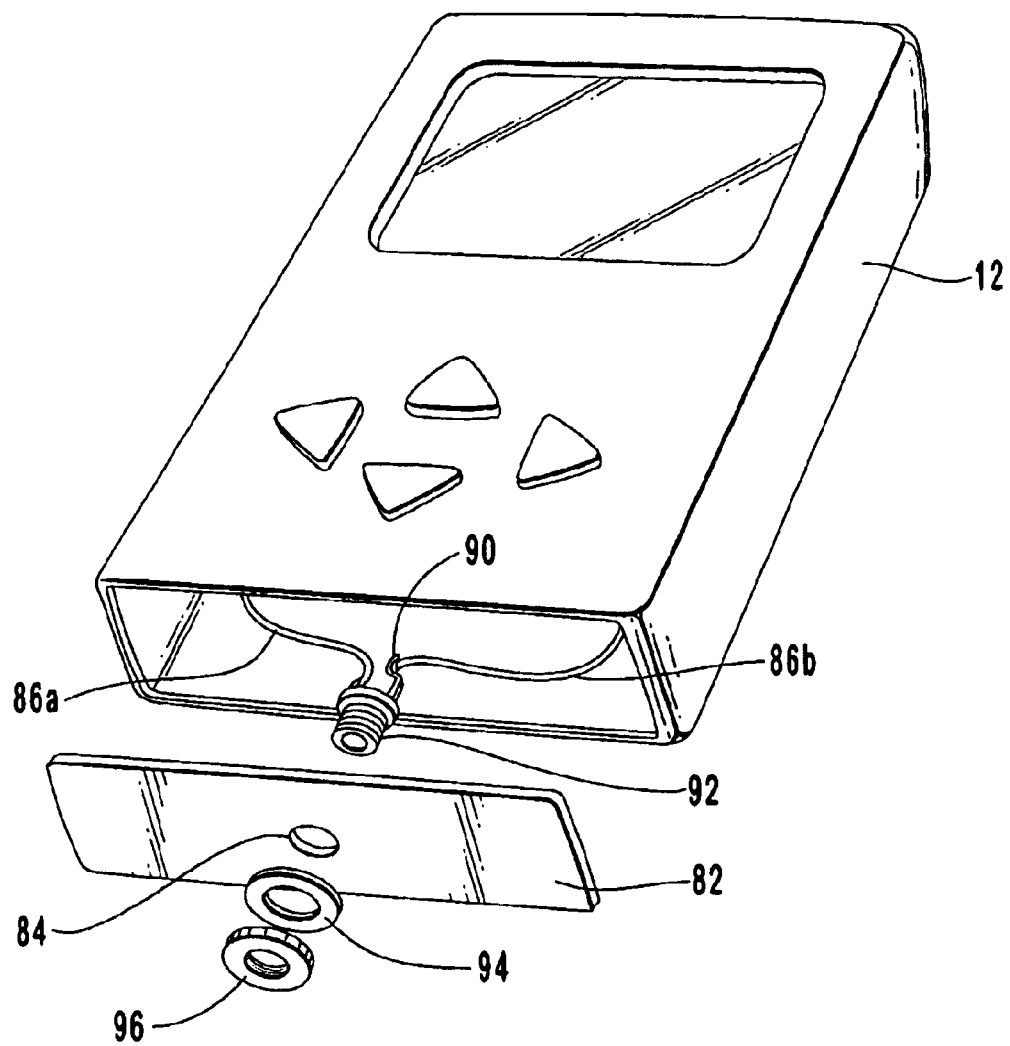
FIG. 12 is an exploded, perspective view of an amusement device converted to be compatible with the belt clip embodiment illustrated in FIGS. 7–10.

FIG. 12 best illustrates how amusement device 12 is modified to incorporate female connector 80. In FIG. 12, amusement device 12 is a hand held video game device, from which a bottom panel 82 has been removed. Note that amusement device 12 can be any toy or device which uses electrical power and for which an electrical circuit required for operation can be interrupted. Amusement device 12 was then modified by boring a hole 84 in bottom panel 82. Then, a wire 86 forming part of a circuit essential for operation of amusement device 12 was removed from within amusement device 12 and cut, thereby forming wires 86a and 86b. Female connector 80, shown in FIG. 12 in an exploded view, was then spliced between wires 86a and 86b. Female connector 80 comprises a threaded tube 88, a lead 90, an insulating layer 92, a washer 94, and a nut 96. Note that wire 86a is soldered to threaded tube 88, whereas wire 86b is soldered to lead 90, which, in turn, is connected to insulator 92. Insulator 92 insulates threaded tube 88 from lead 90. Threaded tube 88 is especially adapted to receive male connector 73, and has a threaded outer surface. When wires 86a and 86b have been properly soldered to threaded tube 88 and lead 90, respectively, threaded tube 88 is inserted through hole 84, passed through washer 94, and threaded into nut 96. Bottom panel 82 is then replaced on amusement device 12, where female connector 80 now appears substantially as shown in FIG. 8. When male connector 73 is fully inserted into female connector 80, outer contact 74 makes contact with the inner wall of threaded tube 88 and inner contact 76 makes contact with lead 90.

When female connector 80 is spliced between wires 86a and 86b, the circuit of which wire 86 was formerly a part is no longer complete, and amusement device 12 ceases to be operational. It should also be noted that when male connector 73 is inserted into female connector 80, amusement device 12 remains inoperable unless male connector 72 at the other end of cable 70 somehow allows electrical contact to be made between its inner contact 76 and outer contact 74. Alternatively, amusement device 12 can be made operable by inserting a series pin into female connector 80. A series pin is simply a male connector such as male connector 72 modified so that outer contact 74 makes permanent electrical contact with inner contact 76. Or more simply, a simple solid metal pin will suffice.

Figure 9:
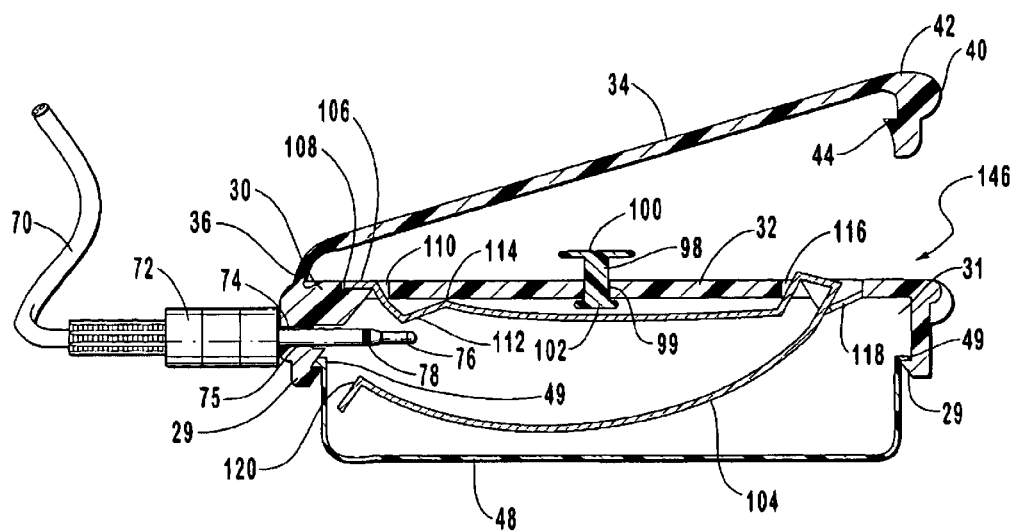
FIG. 9 is a cross-sectional view of the belt clip embodiment shown in FIG. 7, opened to receive therein the seat belt and also receiving one end of the coaxial serial cable.

Referring now to FIG. 9, belt clip 14b is shown in an open position ready for seat belt 16 to be inserted between upper jaw 34 and lower jaw 32. A sliding pin 98 extends through a hole 99 bored in lower jaw 32 and is kept from sliding out of lower jaw 32 by means of top head 100 and bottom head 102, both rigidly fixed at the ends of sliding pin 98. When seat belt 16 is inserted between lower jaw 32 and upper jaw 34, and upper jaw 34 is closed onto lower jaw 32, seat belt 16 and upper jaw 34 urge sliding pin 98 towards pressure pad 48 as far as top head 100 will allow sliding pin 98 to move. Bottom head 102 is thereby brought into contact with a flexible strip 104.

Flexible strip 104 comprises a strip of thin, flexible metal into which various nonelastic deformations have been formed to give flexible strip 104 its desired shape. At one end of flexible strip 104, an end portion 106 rests within a recess 108 formed within body 30 and adapted to receive end portion 106. From end portion 106, flexible strip 104 continues through a slot 110 and continues towards pressure pad 48, abruptly turning upward at a corner 112. Flexible strip 104 then makes contact with body 30 at a corner 114. It should be noted that as sliding pin 98 is urged against flexible strip 104, the position at which corner 114 contacts body 30 moves towards sliding pin 98. Flexible strip 104 then passes under sliding pin 98 and through a slot 116 formed in body 30. Slot 116 can also be beveled to prevent flexible strip 104 from sliding out. Flexible strip 104 then reverses direction, a portion thereof resting against a sloped support surface 118. The remainder of flexible strip 104 is constrained within cavity 31 by pressure pad 48 and terminates with a corner 120. When pressure pad 48 is at its lowest position (when flange 49 rests against shelf 29), corner 120 does not make contact with outer contact 74.

It should also be noted that when upper jaw 34 is open or when upper jaw 34 is locked against lower jaw 32 by means of latch 40, but without inserting seat belt 16 therebetween, sliding pin 98 is not urged downwardly enough to cause corner 112 to make contact with inner contact 76. This can be done by means of a recess 132 that receives sliding pin 98 formed in upper jaw 34.

Figure 10:
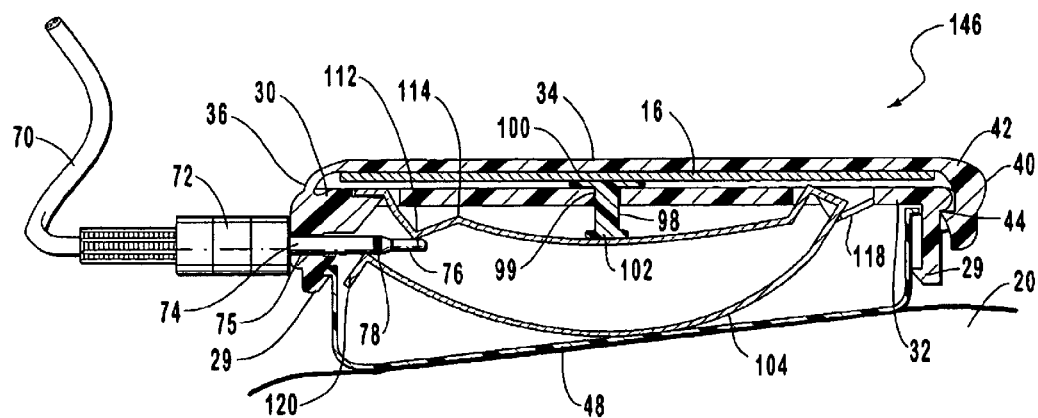
FIG. 10 is a cross-sectional view of FIG. 9 showing the belt clip embodiment pressed against the lap of a passenger and closed upon a seat belt so as to close the double-condition pressure switch mechanism therein.

Turning now to FIG. 10, belt clip 14b is shown with seat belt 16 locked between upper jaw 34 and lower jaw 32 by means of latch 40 and with pressure pad 48 urged further into cavity 31 from being pressed against passenger 20. When pressure pad 48 is urged into cavity 31 so that flange 49 no longer rests on shelf 29, pressure pad 48 urges flexible strip 104, particularly corner 120, in the same direction causing corner 120 to make contact with outer contact 74 of male connector 72. In addition, sliding pin 98 urges flexible strip 104 towards pressure pad 48, causing corner 112 of flexible strip 104 to also make contact with inner contact 76 of male connector 72. The circuit of which wires 86a and 86b (FIG. 12) form a part is once again closed via cable 70 and female connector 80, and amusement device 12 thereby becomes operational.

Notice that the double-condition switch implemented primarily by flexible strip 104 is being taken full advantage of. In other words, unless both corner 120 makes contact with outer contact 74 and corner 112 makes contact with inner contact 76, electrical contact would not be made between outer contact 74 and inner contact 76 of male connector 72. Furthermore, amusement device 12 is not operational unless (1) male connector 73 is inserted in female connector 80 and (2) male connector 72 is inserted into belt clip 14b through a passage 75, thereby allowing outer contact 74 of male connector 72 to make contact with corner 120 and inner contact 76 of male connector 72 to make contact with corner 112.

It should be noted that a number of variations or substitutions may be made to the embodiments presented herein without departing from the spirit of the present invention. For example, although both belt clip 14 and belt clip 14b constitute structures adapted to implement the invention with currently existing conventional seat belts, the invention could be non-removably integrated into a seat belt.

Moreover, the double-condition switch arrangement embodied in belt clip 14 and belt clip 14b could be discarded in favor of a one-condition switch system, so that the only requirement for amusement device 12 to be operational is that pressure pad 48 be urged into cavity 31. The advantage of the double-condition switch arrangement contained in both belt clip 14 and belt clip 14b is that if seat belt 16 must be locked between upper jaw 34 and lower jaw 32 as one of the two conditions for amusement device 12 to operate, it is less likely that pressure pad 48 will be urged upward by anything but pressure pad 48's being pressed against passenger 20.

It should be further noted that pressure pad 48 used in conjunction with flexible strip 104 or pressure pad 48 used in connection with contact plate 50 is just one means for sensing pressure. Several other mechanisms or devices exist or could be developed to perform the same function. For example, piezoelectric transducers or various other spring or leaf spring or other mechanical combinations could be employed. Anything that is able to sense the pressure obtained when seat belt 16 is pressed snugly against passenger is suitable.

An alternative could also be to use a means for sensing tension in the seat belt. A strain gauge or any other means for sensing tension in the seat belt would be suitable. Although such means would not directly sense pressure of the seat belt against a passenger, it could be an effective substitute. To clarify the distinction, means for sensing pressure, then, would sense when seat belt 16 was being pressed against a passenger, whereas a means for sensing tension would not. However, both a means for sensing pressure and a means for sensing tension in the seat belt would be suitable means for sensing when seat belt 16 is snug against a passenger. Similarly, a thermal sensor would be suitable for sensing when seat belt 16 is snug against a passenger by sensing the heat of passenger 20 when seat belt is snug against passenger 20. In addition, a proximity sensor using radar or sonar, for example, would also be suitable for sensing when seat belt 16 is snug against a passenger by sensing when the position of the seat belt is suitably near passenger 20.

It is also possible to use the fact that a seat belt has been engaged or properly coupled to determine when amusement device 12 should be allowed to operate. However, this has disadvantages from determining whether seat belt 16 is situated snugly about passenger 20. First, some seat belts are automatic and do not have couplings to be engaged. Second, as indicated above, some passengers, even children, can couple a seat belt without wearing it, thus defeating its purpose.

It should also be noted that amusement device 12 or any incentive device used with belt clip 14 or belt clip 14b has its own power source, such as a battery. No additional power source is required, although a control means witholding power from an external source from an incentive device could also be employed.

It should also be noted that, together, flexible strip 104, pressure pad 48, male connector 72, cable 70, and female connector 80 all form a control means for preventing amusement device 12 from operating properly unless a pressure sensor means senses that seat belt 16 is properly secured or sufficiently snug against a person secured by seat belt 16. Many other structures could be used to perform this same function. For example, in place of female connector 80, a remote controlled switch could be placed within amusement device 12. This switch would prevent amusement device 12 from operating until it received a transmitted code or message from a transmitter when a pressure sensor, for example, sensed that seat belt 16 was properly secured or substantially snug against a person secured by seat belt 16. This embodiment differs from belt clip 14b, cable 70, and female connector 80 in that with the latter, the switch or control means for preventing amusement device 12 from operating properly has effectively been moved from within amusement device 12 to belt clip 14b. Nevertheless, certain other embodiments might place a switch or other control means for preventing amusement device 12 from operating properly either in amusement device 12 or somewhere between the path of communication between a pressure sensor means, for example, and amusement device 12.

The method of this invention is designed to create within passenger 20 an almost reflexive action for securing seat belt 16 any time passenger 20 sits on seat 22. Further, the method of this invention encourages passenger 20 to secure seat belt 16 in a snug fitting relationship whenever seat belt 16 is thus secured. To accomplish these highly desirable goals, belt clip 14 or belt clip 14b is provided as an attachment and activation mechanism for amusement device 12. Attachment of belt clip 14 or belt clip 14b is achieved through lower jaw 32 engagedly receiving seat belt 16 in a snug fitting relationship in cooperation with upper jaw 34.

Clamping of seat belt 16 between lower jaw 32 and upper jaw 34 causes one condition of a double-condition switch to be met. This is implemented in belt clip 14 and belt clip 14b in two different ways, as described above. The further tightening of seat belt 16 about passenger 20 forces belt clip 14 or belt clip 14b against the lap or body of passenger 20, thereby depressing pressure pad 48 upwardly into cavity 31 or otherwise meeting the second condition of the double-condition switch embodied in both belt clip 14 and belt clip 14b. In this manner, securement of seat belt 16 between lower jaw 32 and upper jaw 34 along with the snug application of seat belt 16 across the lap or body of passenger 20 completes the electrical circuit necessary for operation of amusement device 12. Accordingly, passenger 20 receives a positive reinforcement each time seat belt 16 is properly secured thereby providing an incentive for the regular and proper use of seat belt 16.

Advantageously, amusement device 12 is inoperable until the foregoing securement sequence for seat belt 16 has been completed and, furthermore, while the integrity of the same is maintained. If at any time seat belt 16 is (1) not sufficiently engaged between lower jaw 32 and upper jaw 34 to meet the first condition of the double-condition switch mechanism embodied in either belt clip 14 or belt clip 14b or, (2) only loosely secured about passenger 20, so as to fail the second condition of the double-condition switch mechanism embodied in belt clip 14 or belt clip 14b, then the electrical circuit for amusement device 12 will be interrupted. Interruption of the electrical circuit to amusement device 12 will cause amusement device 12 to cease to function, thereby alerting passenger 20 or the appropriate care giver (such as a driver 122, shown in FIG. 11) of the need to correct the particular deficiency. The most likely deficiency to occur is the loss of sufficient tension on seat belt and this provides an important teaching moment since it continually reminds passenger of the need to have seat belt 16 snugly engaged.

Figure 11:
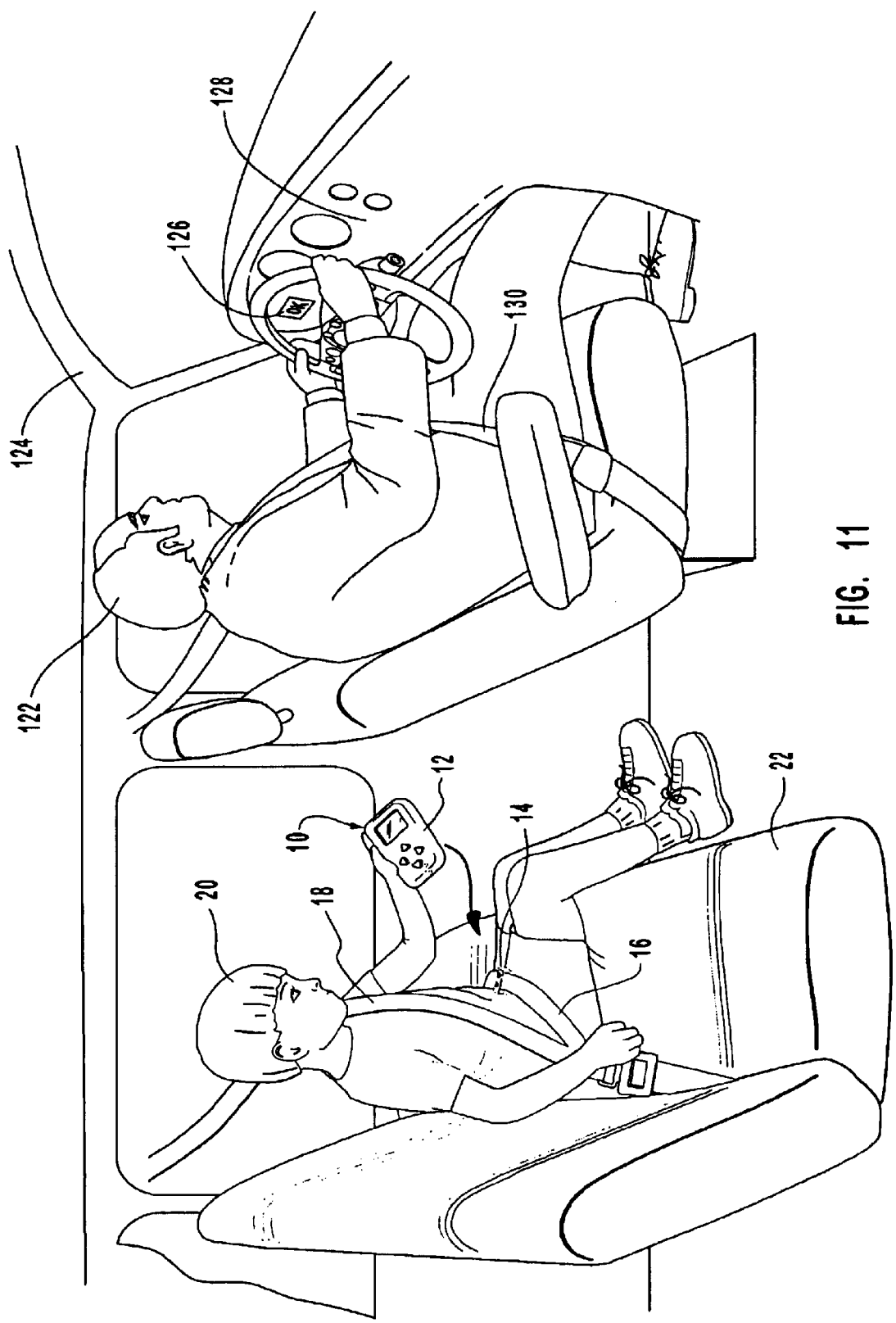
FIG. 11 is a perspective view of a passenger wearing a seat belt with the belt clip embodiment illustrated in FIGS. 1–6 attached thereto, and a driver monitoring that the seat belt is properly secured about the passenger.

Referring now to FIG. 1, passenger 20 is shown riding in seat 22 while a vehicle 124 is being driven by a driver 122. A modified belt clip 14 is secured to seat belt 16, and pressure pad 48 is being pressed upwardly into cavity 31 by the body of passenger 20, since seat belt 16 is properly and snugly secured about passenger 20. FIG. 11 illustrates that not only can belt clip 14 or belt clip 14b be used to make the operation of an amusement device conditional on proper securement of a seat belt, but its pressure sensing mechanism can also be used to determine when to relay a message to the driver of a vehicle or some other person, usually an adult, that the seat belt is and/or not properly secured. In FIG. 11, driver 122 is driving and cannot see passenger 20, who is sitting directly behind driver 122. However, an icon 126, located in instrument panel 128 communicates to driver 122 that seat belt 16 is properly secured. This information may be transmitted with a cable similar to cable 70, by means of radio transmission, or other well known means for communicating electronic signals.

Alternatively, the present invention could be used to prevent vehicle 124 from even being able to start unless seat belt 16 and/or a seat belt 130 are properly secured about passenger 20 and/or driver 122, respectively.

Moreover, as illustrated in FIG. 11, both purposes of the present invention can be served simultaneously. If seat belt 16 is not properly secured about passenger 20, amusement device 12 will not operate; moreover, this fact can simultaneously be communicated to driver 122 by means of the non-illumination of icon 126 or some other method, such as the illumination of another icon, an audio sound or beeping, or the like. The use of belt clip 14 or belt clip 14b in this way has significant advantages over conventional seat belt monitoring systems.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A system for encouraging a person to use a seat belt comprising:
   (a) sensor means for sensing when a seat belt is snug against a person secured by said seat belt;
   (b) an incentive device; and
   (c) control means for activating the operation of said incentive device only in the event that said sensor means senses that said seat belt is snug against said person, said control means comprising a wireless protocol.

2. A system for encouraging a person to use a seat belt as recited in claim 1, wherein said sensor means comprises pressure sensor means for sensing pressure, said pressure sensor means sensing that said seat belt is snug against said person when said seat belt is being pressed against said person.

3. A system for encouraging a person to use a seat belt as recited in claim 2, wherein said pressure sensor means is placed between said seat belt and said person.

4. A system for encouraging a person to use a seat belt as recited in claim 2, wherein said pressure sensor means is a spring.

5. A system for encouraging a person to use a seat belt as recited in claim 4, wherein said spring comprises a flexible metal strip.

6. A system for encouraging a person to use a seat belt as recited in claim 1, wherein said sensor means comprises tension sensor means for sensing tension in said seat belt, said tension sensor means sensing that said seat belt is snug against said person by sensing tension in said seat belt.

7. A system for encouraging a person to use a seat belt as recited in claim 6, wherein said tension sensor means comprises a strain gauge operably attached to said seat belt.

8. A system for encouraging a person to use a seat belt as recited in claim 1, wherein said sensor means comprises thermal sensor means for sensing heat emitted from said person, said thermal sensor means sensing that said seat belt is snug against said person by sensing heat emitted from said person.

9. A system for encouraging a person to use a seat belt as recited in claim 1, wherein said sensor means comprises proximity sensor means for sensing the proximity of said seat belt to said person, said proximity sensor means sensing that said seat belt is snug against said person by sensing the proximity of said seat belt to said person.

10. A system for encouraging a person to use a seat belt as recited in claim 1, wherein said incentive device comprises an electric-powered amusement device.

11. A system for encouraging a person to use a seat belt as recited in claim 1, wherein said control means comprises a switch in an electric circuit, said switch closing when said sensor means senses that said seat belt is snug against said person.

12. A system for encouraging a person to use a seat belt as recited in claim 1, wherein said system further comprises an attachment means for attaching said sensor means to said seat belt.

13. A system for encouraging a person to use a seat belt as recited in claim 12, wherein said attachment means comprises means for releasably attaching said sensor means to said seat belt.

14. A system for encouraging a person to use a seat belt as recited in claim 13, wherein said control means further prevents said incentive device from operating properly unless said sensor means is attached by said attachment means to said seat belt.

15. A system for encouraging a person to use a seat belt as recited in claim 1, wherein said person is secured within a vehicle and said incentive device is said vehicle.

16. A system for encouraging a person to use a seat belt comprising:
   (a) pressure sensor means for sensing when a seat belt is being pressed against a person secured by said seat belt;
   (b) attachment means for releasably attaching said pressure sensor means to said seat belt;
   (c) an electric-powered amusement device; and
   (d) a wireless communication system built into said pressure sensor means and said electric-powered amusement device that allows activation of said amusement device only when:
      (i) said pressure sensor means transmits a signal that indicates said seat belt is being pressed against said person, and
      (ii) said pressure sensor means is attached by said attachment means to said seat belt.

17. A system for encouraging a person to use a seat belt as recited in claim 16, wherein said pressure sensor means is placed between said seat belt and said person.

18. A system for encouraging a person to use a seat belt as recited in claim 16, wherein said pressure sensor means is a spring.

19. A system for encouraging a person to use a seat belt as recited in claim 18, wherein said spring comprises a flexible metal strip.

20. A system for encouraging a person to use a seat belt as recited in claim 16, wherein said amusement device cannot operate properly unless said amusement device is electrically connected to said pressure sensor means.

21. A device for use with a system for encouraging a person to use a seat belt comprising:
   (a) sensor means for sensing when a seat belt is snug against a person secured by said seat belt;
   (b) control means for preventing an incentive device from operating properly unless said sensor means senses that said seat belt is snug against said person, said sensor means and said control means in communication with one another via a wireless communication system.

22. A device for use with a system for encouraging a person to use a seat belt as recited in claim 21, wherein said sensor means comprises a pressure sensor means for sensing pressure, said pressure sensor means sensing that said seat belt is snug against said person when said seat belt is being pressed against said person.

23. A device for use with a system for encouraging a person to use a seat belt as recited in claim 22, wherein said pressure sensor means is placed between said seat belt and said person.

24. A device for use with a system for encouraging a person to use a seat belt as recited in claim 22, wherein said pressure sensor means is a spring.

25. A device for use with a system for encouraging a person to use a seat belt as recited in claim 24, wherein said spring comprises a flexible metal strip.

26. A device for use with a system for encouraging a person to use a seat belt as recited in claim 21, wherein said comprises tension sensor means for sensing tension in said seat belt, said tension sensor means sensing that said seat belt is snug against said person by sensing tension in said seat belt.

27. A device for use with a system for encouraging a person to use a seat belt as recited in claim 26, wherein said tension sensor means comprises a strain gauge operably attached to said seat belt.

28. A device for use with a system for encouraging a person to use a seat belt as recited in claim 21, wherein said incentive device comprises an electric-powered amusement device.

29. A device for use with a system for encouraging a person to use a seat belt as recited in claim 21, wherein said control means comprises a switch in an electric circuit, said switch closing when said sensor means senses that said seat belt is snug against said person.

30. A device for use with a system for encouraging a person to use a seat belt as recited in claim 21, wherein said device further comprises an attachment means for attaching said sensor means to said belt.

31. A device for use with a system for encouraging a person to use a seat belt as recited in claim 30, wherein said attachment means comprises means for releasably attaching said sensor means to said belt.

32. A device for use with a system for encouraging a person to use a seat belt as recited in claim 31, wherein said control means further prevents said incentive device from operating properly unless said sensor means is attached by said attachment means to said belt.

33. A device for monitoring whether a seat belt is properly secured about a passenger and for activating an incentive device, said device comprising:
   (a) sensor means for sensing when a seat belt is snug against a person secured by said seat belt;
   (b) means for communicating, via a wireless transmission, whether a seat belt is properly secured around an individual by activating said incentive device only if said seat belt is properly secured.

34. A device for monitoring whether a seat belt is properly secured about a passenger as recited in claim 33, wherein said sensor means comprises a pressure sensor means for sensing pressure, said pressure sensor means sensing that said seat belt is snug against said person when said seat belt is being pressed against said person.

35. A device for monitoring whether a seat belt is properly secured about a passenger as recited in claim 33, wherein said person is secured within a vehicle and said means for communicating comprises a visual indicator on an instrument panel of said vehicle.

* * * * *